United States Patent
Kasper

[11] Patent Number: 5,542,492
[45] Date of Patent: Aug. 6, 1996

[54] DEVICE FOR DRIVING, GUIDING AND STEERING A VEHICLE WHEEL

[75] Inventor: Ernst Kasper, Munderkingen, Germany

[73] Assignee: EC Engineering+Consulting Spezialmaschinen GmbH, Ulm-Donautal, Germany

[21] Appl. No.: 226,482

[22] Filed: Apr. 12, 1994

[30] Foreign Application Priority Data

Apr. 15, 1993 [DE] Germany ............................ 9305633 U

[51] Int. Cl.⁶ ................. B60K 7/00; B60G 3/20
[52] U.S. Cl. .................... 180/253; 180/308; 280/668; 280/691
[58] Field of Search ..................... 180/308, 305, 180/307, 55, 253, 252, 242; 280/663, 668, 691, 696

[56] References Cited

U.S. PATENT DOCUMENTS

| | | | |
|---|---|---|---|
| 3,037,787 | 6/1962 | Gottschald | 280/668 |
| 3,161,246 | 12/1964 | Meeker et al. | 180/308 |
| 3,581,682 | 6/1971 | Kontranowski | 180/55 |
| 3,997,018 | 12/1976 | Herbst | 180/55 |
| 4,162,713 | 7/1979 | Heitman et al. | 180/308 |
| 4,274,654 | 6/1981 | Travaglio | 280/668 |
| 5,150,763 | 9/1992 | Yamashita et al. | 180/252 |
| 5,472,062 | 12/1995 | Nagai et al. | 180/308 |

FOREIGN PATENT DOCUMENTS

| | | | |
|---|---|---|---|
| 562122 | 9/1993 | European Pat. Off. | 180/308 |
| 1120290 | 12/1961 | Germany | 180/253 |
| 93/05969 | 4/1993 | WIPO . | |
| 93/08039 | 4/1993 | WIPO | 180/308 |

*Primary Examiner*—Anne Marie Boehler
*Assistant Examiner*—Peter C. English
*Attorney, Agent, or Firm*—Rothwell, Figg, Ernst & Kurz, P.C.

[57] ABSTRACT

A device for driving, guiding and steering a vehicle wheel comprises a link-guided shock-absorbing cylinder through which a hydraulic oil passage extends. The hydraulic oil passage feeds a hydraulic motor which is provided in the area of the wheel hub and which acts on a shift transmission that is also provided in the hub area. The wheel hub is substantially arranged at the level of the vehicle frame which supports a transverse bar on which the upper end of the shock-absorbing cylinder is movably supported.

5 Claims, 2 Drawing Sheets

DEVICE FOR DRIVING, GUIDING AND STEERING A VEHICLE WHEEL

BACKGROUND OF THE INVENTION

Conventional vehicles, especially heavy-duty vehicles, have a considerable (frame) height on account of their conventional chassis and wheel suspension structure. For instance, conventional rigid axles need a lot of space in the area of the longitudinal axis of the vehicle, i.e. in the area of the vehicle center, resulting in considerable heights of the vehicle frame above ground on account of the long shock-absorbing travels that are typical of rigid axles, especially in the case of large wheel or tire diameters.

Likewise, conventional distributor shift means require a lot of space along the longitudinal vehicle axis, i.e., in the center of the vehicle, because universal joint shafts have to be guided up to the driven wheels. This results in considerable heights of the vehicle frame above the road surface when conventional distributor shift means are used.

Vehicles, in particular heavy-duty vehicles, which operate on sites or are to pass through entrances of workshops, as well as heavy-duty vehicles of that type which are to run on public roads and are to travel below bridges or through tunnels are subject to restrictions with respect to their overall height. This has the effect that an increase in the usable vehicle height, i.e., the height above the vehicle frame, can more or less only be achieved through a corresponding reduction of the vehicle frame height (above ground).

SUMMARY OF THE INVENTION

It is therefore the object of the present invention to permit a considerable reduction of the frame height by innovation in the field of wheel suspension and driving concepts for vehicles, in particular heavy-duty vehicles.

The technical progress which can be achieved with the help of the present invention is primarily due to the fact that the vehicle frame can be lowered to a very considerable extent because there are neither rigid axles nor universal joint shafts according to the invention.

BRIEF DESCRIPTION OF THE DRAWINGS

The invention shall now be described in more detail with reference to an embodiment taken in conjunction with the drawing figures, in which.

DETAILED DESCRIPTION OF PREFERRED EMBODIMENTS

Figure 1:
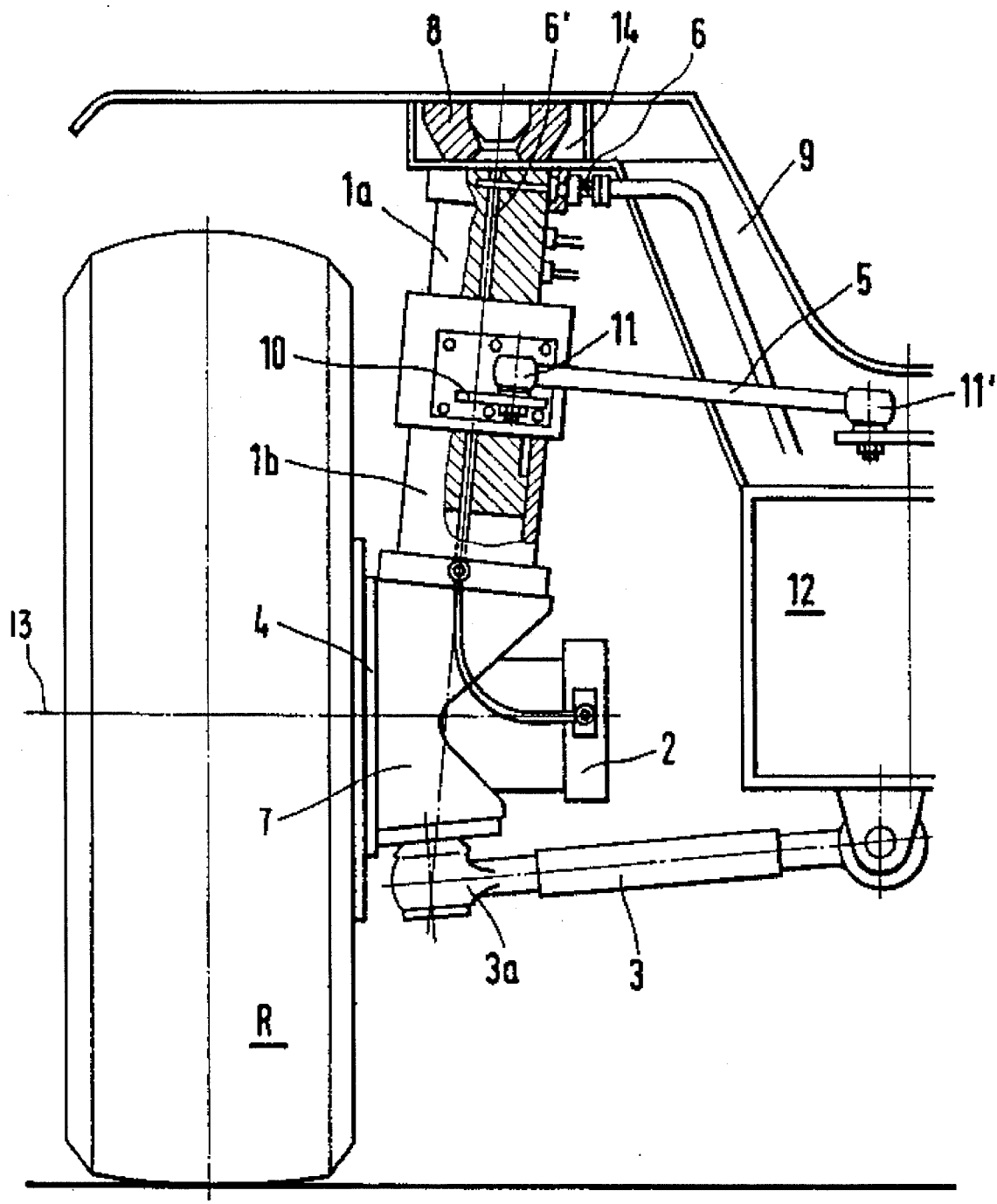
FIG. 1 is a partly sectional view of the device of the invention.

As illustrated in FIG. 1, the vehicle wheel R which includes a wheel axle 1 is held on an axle carrier 7 and guided with the aid of a shock-absorbing cylinder and with the aid of transverse links 3. The shock-absorbing cylinder comprises an inner tube 1a and an outer tube 1b. The inner and outer tubes are arranged in a displaceable manner and rotatable relative to each other.

A hydraulic oil supply passage 6', which substantially consists of two concentric tubes that are sealed such that the two tubes can move in a longitudinal direction with respect to each other and rotate relative to each other, extends centrally through the shock-absorbing cylinder. Furthermore, the hydraulic oil passage 6' is provided with oil compensating means (not shown) for compensating for changes in volume due to shock-absorbing movements.

The hydraulic passage 6' is connected to a hydraulic oil supply 6. The hydraulic oil passage 6' is in flow communication with a hydraulic motor 2 which represents a single-wheel drive and is accommodated together with a shift transmission 4 in the axle carrier 7. The axle carrier 7 and thus the hydraulic motor 2 and the shift transmission 4 are arranged in the hub area of the vehicle wheel R, i.e., in the area of the wheel axle and the rotary center 13 of the wheel, respectively.

The lower end of the outer tube 1b of the shock-absorbing cylinder is firmly connected to the upper side of the axle carrier 7, while the upper end of the inner tube 1a of the the shock-absorbing cylinder is supported in a spatially movable or three-dimensionally movable manner in an elastic bearing 8. This elastic bearing 8, which is preferably designed as a rubber bearing, is secured to a transverse bar 14 which extends substantially in parallel with the rotary center 13.

The transverse bar 14 is held by a carrier 9 whose upper end has connected thereto the transverse bar. The lower end of carrier 9 is welded to vehicle frame 12.

As illustrated in FIG. 1, vehicle frame 12 is arranged at such a low level that it is substantially at the level of the rotary center 13, i.e., substantially at the level of hydraulic motor 2.

The two transverse links 3 are articulated to the bottom side of the axle carrier 7 with their ends 3a facing the vehicle wheel while the opposite ends of the transverse links 3 are articulated to the bottom side of the vehicle frame 12.

Figure 2:
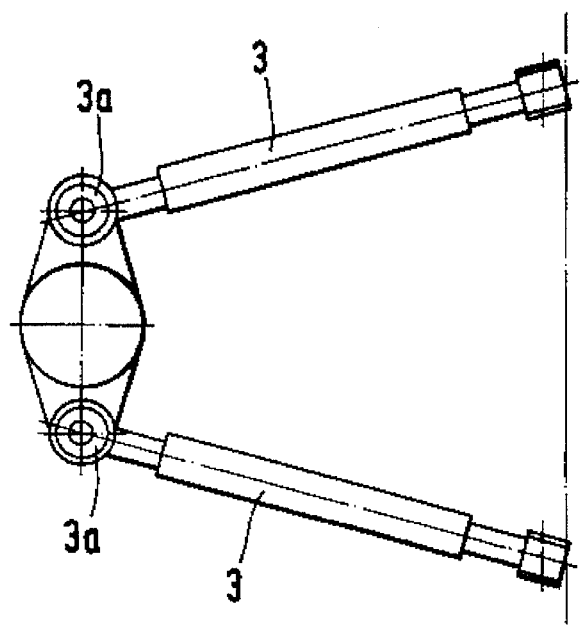
FIG. 2 shows a first embodiment of the links provided for guiding the shock-absorbing cylinder.
Figure 3:
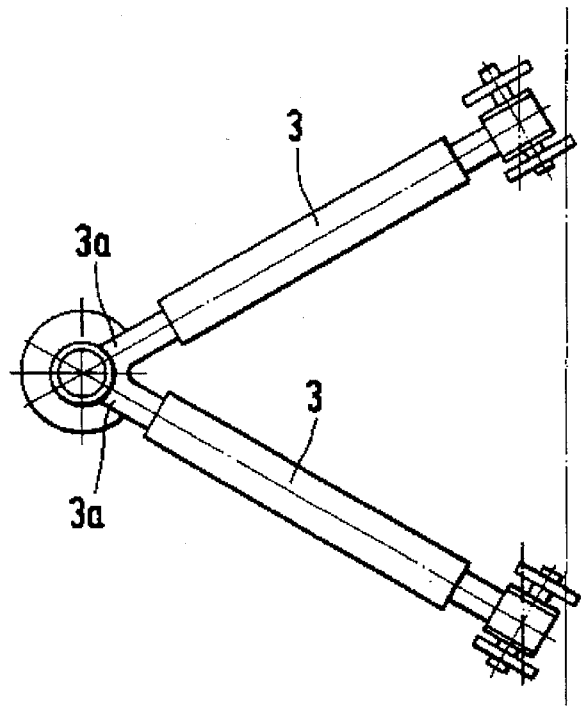
FIG. 3 shows a second embodiment of the links provided for guiding the shock-absorbing cylinder.

In accordance with the embodiment shown in FIG. 2, ends 3a of the two links are articulated in spaced-apart relationship. In accordance with the embodiment shown in FIG. 3, however, ends 3a of the two tranverse links 3 are connected to each other.

The transverse links 3 serve to receive the acceleration forces and braking forces arising during vehicle operation and also the lateral guide forces and the resultant support forces from the vertical force (when the device of the invention is used for crane vehicles). As a result of the two transverse links 3, carrier 9 only has to receive the vertical force and the residual braking and accelerating forces. As a consequence, the construction according to the invention relieves carrier 9 of all the forces that are received by the transverse carriers. This, in turn, has the effect that carrier 9 can be designed in a constructionally very simple and thus weight-reducing manner.

As is also illustrated in FIG. 1, a swivel link 10 is secured to the outer tube 1b of the shock-absorbing cylinder, with the outer tube 1b being firmly connected to axle carrier 7. A tie rod 5 is supported in a spatially, i.e. three-dimensionally movable manner with the aid of a first ball-shaped head 11. A second ball-shaped head 11' is provided at the other end of tie rod 5 and connected to a means (not shown) for guiding vehicle wheel R.

In the area of the shock-absorbing cylinder 1a, 1b, the hydraulic oil passage 6' consists of a first tubular section provided centrally in the inner tube 1a of the shock-absorbing cylinder and of a second tubular section provided centrally in the outer tube 1b of the shock-absorbing cylinder. These two sections of the oil passage 6' have different diameters, so that the two tubular sections are fitted into each other in overlapping fashion over a certain length. At the same time, the two tubular sections are sealed relative to each other, so that relative movements of the (shock-absorbing) outer tube 1*b* of the shock-absorbing cylinder relative to the inner tube 1*a* of the shock-absorbing cylinder (which belongs to the sprung mass) can be followed by the two tubular sections of the oil passage 6'. As already mentioned, compensator reservoirs or the like are provided for compensating changes in volume caused by shock-absorbing movements.

I claim:

1. A vehicle wheel mounted on a vehicle frame, in combination with an apparatus for driving and steering the vehicle wheel, the combination comprising:

a vehicle frame having an upper section and a lower section;

a wheel movably mounted on the vehicle frame, the wheel including a hub and being rotatable about a rotary axis;

an axle carrier disposed in substantial alignment with the rotary axis of the wheel;

a link-guided shock-absorbing cylinder including an inner tube and an outer tube, the inner tube being partially disposed within the outer tube, and a hydraulic fluid passage extending through the inner and outer tubes, wherein the inner tube has an upper end secured to the upper section of the vehicle frame so as to be movable in a multi-directional manner with respect to the vehicle frame by an elastic bearing, the bearing being secured to a transverse bar at the upper section of the vehicle frame, and wherein the outer tube has a lower end secured to the axle carrier;

a shift transmission received in the axle carrier;

a hydraulic motor fluidly connected to the hydraulic fluid passage extending through the link-guided shock-absorbing cylinder, the hydraulic motor received in the axle carrier; and wherein the shift transmission and the hydraulic motor are disposed in an area adjacent to the hub of the wheel, and wherein the lower section of the vehicle frame is disposed substantially coextensive with the rotary axis of the wheel.

2. The combination of claim 1, further comprising two transverse links each of which has first and second opposite ends, the first end of each link being secured to a bottom portion of the axle carrier and the second end of each link being movably attached to the lower section of the vehicle frame.

3. The combination of claim 2, wherein the first ends of the two links are interconnected.

4. The combination of claim 2, wherein the outer tube of the shock-absorbing cylinder has a swivel link secured thereto, and a ball-shaped end of a tie rod is supported on the swivel link.

5. The combination of claim 2, wherein the shift transmission is shiftable in two steps.

\* \* \* \* \*